United States Patent
Gaurav et al.

(10) Patent No.: US 10,353,739 B2
(45) Date of Patent: Jul. 16, 2019

(54) VIRTUAL RESOURCE SCHEDULING FOR CONTAINERS WITHOUT MIGRATION

(71) Applicant: VMWARE, INC., Palo Alto, CA (US)

(72) Inventors: Kumar Gaurav, Bangalore (IN); Anne Holler, Palo Alto, CA (US); Vaibhav Kohli, Bangalore (IN); Anil Kumar, Pune (IN); Shruti Sharma, Bangalore (IN); Rajdeep Dua, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 78 days.

(21) Appl. No.: 14/983,544

(22) Filed: Dec. 30, 2015

(65) Prior Publication Data
US 2016/0378564 A1    Dec. 29, 2016

(30) Foreign Application Priority Data
Jun. 27, 2015 (IN) ............................ 3255/CHE/2015

(51) Int. Cl.
*G06F 9/50*    (2006.01)
*G06F 9/455*    (2018.01)

(52) U.S. Cl.
CPC ............ *G06F 9/50* (2013.01); *G06F 9/45558* (2013.01); *G06F 9/5077* (2013.01); *G06F 2009/4557* (2013.01); *G06F 2009/45562* (2013.01)

(58) Field of Classification Search
CPC .............. G06F 9/5077; G06F 9/45558; G06F 2009/4557; G06F 9/50; G06F 2009/45562
See application file for complete search history.

(56) References Cited

U.S. PATENT DOCUMENTS

| | | | |
|---|---|---|---|
| 2009/0007099 A1* | 1/2009 | Cummings | G06F 9/45558 718/1 |
| 2010/0070784 A1* | 3/2010 | Gupta | G06F 1/3203 713/310 |
| 2010/0169536 A1 | 7/2010 | Shedel | |
| 2013/0055254 A1* | 2/2013 | Avasthi | G06F 9/45533 718/1 |
| 2014/0026133 A1 | 1/2014 | Parker | |
| 2014/0068611 A1* | 3/2014 | McGrath | G06F 9/45533 718/1 |
| 2014/0137104 A1* | 5/2014 | Nelson | G06F 9/45558 718/1 |
| 2015/0052250 A1* | 2/2015 | Doganata | H04L 47/78 709/226 |

\* cited by examiner

*Primary Examiner* — Jacob D Dascomb
(74) *Attorney, Agent, or Firm* — Thomas | Horstemeyer, LLP

(57) ABSTRACT

A method for scheduling computing resources without container migration includes determining a resource availability for one or more hosts, a resource allocation for one or more virtual machines (VMs), and a resource usage for one or more containers. The method further includes calculating a target resource configuration for one or more VMs, wherein calculating a target resource configuration comprises determining an upper limit of resource demand on a VM from one or more containers allocated on the VM, based at least in part on the resource usage. The method also includes removing or adding resources to each of the one or more VMs for which a target resource configuration was calculated to achieve the target resource configuration for each VM. The method further includes allocating the one or more VMs on the one or more hosts based on the resource availability of the one or more hosts.

17 Claims, 4 Drawing Sheets

VIRTUAL RESOURCE SCHEDULING FOR CONTAINERS WITHOUT MIGRATION

CROSS REFERENCE TO RELATED PATENT APPLICATIONS

This application is related to U.S. patent application Ser. No. 14/835,758, filed concurrently herewith, entitled "Virtual Resource Scheduling for Containers with Migration."

RELATED APPLICATIONS

Benefit is claimed under 35 U.S.C. 119(a)-(d) to Foreign application Serial No. 3255/CHE/2015 filed in India entitled "VIRTUAL RESOURCE SCHEDULING FOR CONTAINERS WITHOUT MIGRATION", on Jun. 27, 2015, by VMware, Inc., which is herein incorporated in its entirety by reference for all purposes.

BACKGROUND

Containerization technology is becoming popular among developers and information technology administrators. Containers and virtual machines can co-exist as parent-child, as siblings, or as child-parent relationships. With containers hosted on virtual machines (VMs), virtual machines form a ubiquitous and elastic fabric for hosting a container cloud. Application code may then run on a nested virtualization stack, which requires resource optimization and tuning for performance gain in each layer.

If resources are not correctly allocated, resources in a datacenter may be wasted. In system where container migration is not used, some VMs may end up with more resources than necessary for their assigned containers, while other VMs become over-committed, with not enough resources. Resources may therefore be wasted if the containers and VMs are not properly allocated.

SUMMARY

One or more embodiments provide techniques for scheduling distributed resources in a container cloud running on virtual infrastructure. A method for scheduling computing resources includes determining a resource availability for one or more hosts, a resource allocation for one or more virtual machines (VMs), and a resource usage for one or more containers. The method further includes calculating a target resource configuration for one or more VMs, wherein calculating a target resource configuration includes determining an upper limit of resource demand on a VM from one or more containers allocated on the VM, based at least in part on the resource usage. The method also includes removing or adding resources to each of the one or more VMs for which a target resource configuration was calculated to achieve the target resource configuration for each VM. The method further includes allocating the one or more VMs on the one or more hosts based on the resource availability of the one or more hosts.

Further embodiments include a non-transitory computer-readable storage medium including instructions that cause a computer system to carry out the above method.

DETAILED DESCRIPTION

Embodiments provide a method of scheduling computing resources in a container cloud running on virtual infrastructure without migration of containers. Resources can be optimized across layers by the algorithms described below. Embodiments described herein reduce wastage of underlying physical resources in a datacenter.

Figure 1:
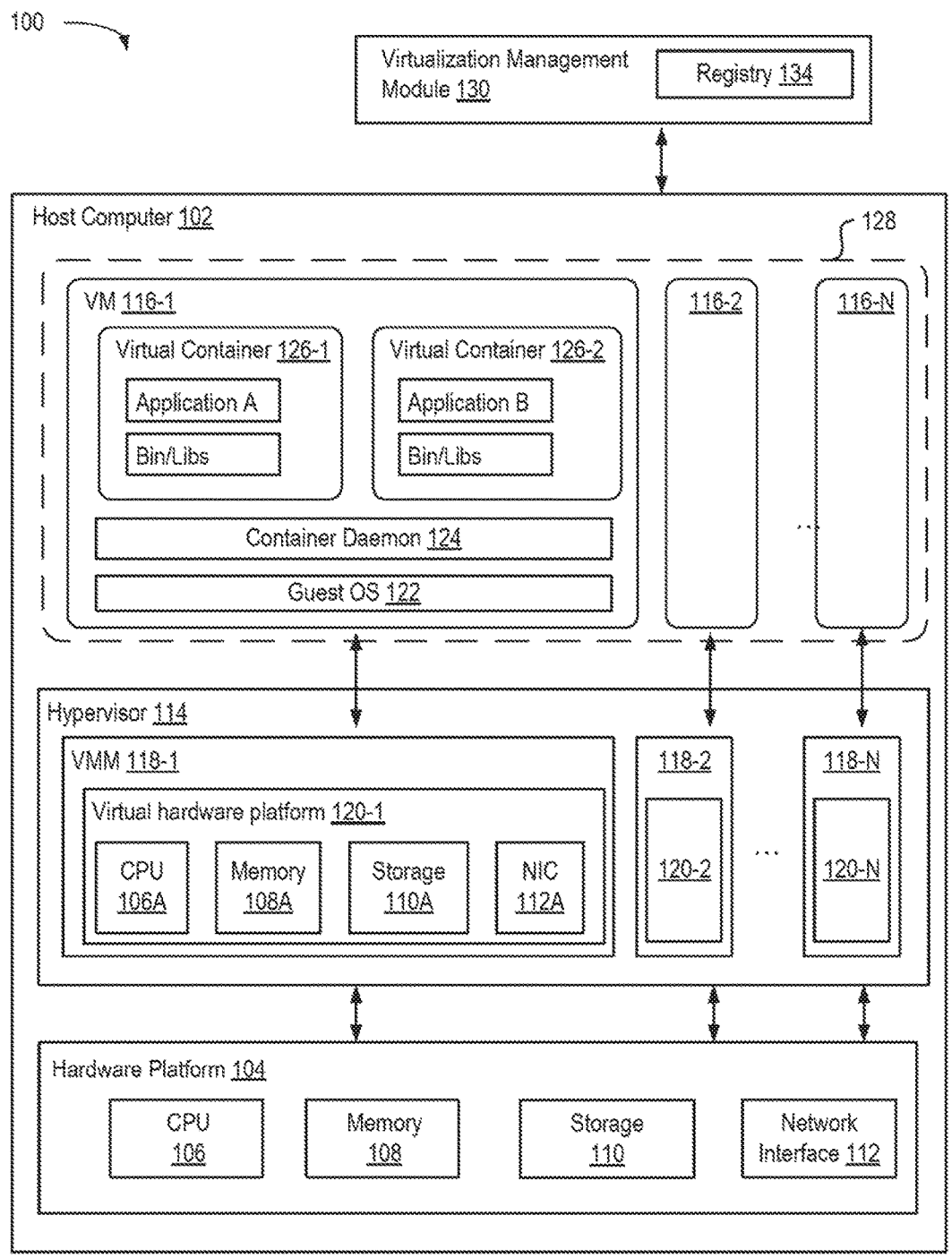
FIG. 1 is a block diagram that illustrates a computing system in accordance with one embodiment.

FIG. 1 is a block diagram that illustrates a computing system 100 with which one or more embodiments of the present disclosure may be utilized. As illustrated, computing system 100 includes at least one host computer 102. Although a single host is depicted in FIG. 1, it is recognized that computing system 100 may include a plurality of host computers 102, which can be arranged in an interconnected server system such as a data center.

Host 102 is configured to provide a virtualization layer that abstracts computing resources of a hardware platform 104 into multiple virtual machines (VMs) 116 that run concurrently on the same host 102. Hardware platform 104 of host 102 includes CPU 106, memory 108, storage 110, networking interface 112, and other conventional components of a computing device. VMs 116 run on top of a software interface layer, referred to herein as a hypervisor 114, that enables sharing of the hardware resources of host 102 by the virtual machines. One example of hypervisor 114 that may be used in an embodiment described herein is a VMware ESXi™ hypervisor provided as part of the VMware vSphere® solution made commercially available from VMware, Inc of Palo Alto, Calif. Hypervisor 114 provides a device driver layer configured to map physical resource of hardware platforms 104 to "virtual" resources of each VM 116 such that each VM 116-1 to 116-N has its own corresponding virtual hardware platform (e.g., a corresponding one of virtual hardware platforms 120-1 to 120-N). Each such virtual hardware platform 120 provides emulated hardware (e.g., memory 108A, processor 106A, storage 110A, network interface 112A, etc.) that may, for example, function as an equivalent, conventional hardware architecture for its corresponding VM 116. Virtual hardware platforms 120-1 to 120-N may be considered part of virtual machine monitors (VMMs) 118-1 to 118-N which implement virtual system support to coordinate operations between hypervisor 114 and corresponding VMs 116-1 to 116-N in the pool of VMs 128.

Hypervisor 114 may run on top of a host operating system of host 102 or directly on hardware components of host 102. Each VM 116 includes a guest operating system 122 (e.g., Microsoft Windows®, Linux™) and one or more guest applications and processes running on top of guest operating system 122.

In one or more embodiments, each VM 116 includes a container daemon 124 installed therein and running as a guest application under control of guest OS 122. Container daemon 124 is a process that enables the deployment and management of virtual instances (referred to interchangeably herein as "containers" or "virtual containers") by providing a layer of operating-system-level virtualization on guest OS 122 within VM 116. Containers 126 are software instances that enable virtualization at the operating system level. That is, with containerization, the kernel of an operating system that manages a host computer is configured to provide multiple isolated user space instances. These instances, referred to as containers, appear as unique servers from the standpoint of an end user that communicates with the containers. However, from the standpoint of the operating system that manages the host computer on which the containers execute, the containers are user processes that are scheduled and dispatched by the operating system. Examples of a container daemon include the open-source Docker platform made available by Docker, Inc. and Linux Containers (LXC).

Computing system 100 includes virtualization management module 130 that may communicate with the one or more hosts 102. Virtualization management module 130 is configured to carry out administrative tasks for the computing system 100, including managing hosts 102, managing VMs running within each host 102, provisioning VMs, migrating VMs from one host to another host, and load balancing between hosts 102. In one embodiment, virtualization management module 130 is a computer program that resides and executes in a central server, which may reside in computing system 100, or alternatively, running as a VM in one of hosts 102. One example of virtualization management module 130 is the vCenter Server® product made available from VMware. Inc.

In one or more embodiments, virtualization management module 130 is configured to perform resource management for virtual containers 126 in a virtualized environment. Virtualization management module 130 may create a virtual infrastructure by instantiating a packaged group (or pool 128) of a plurality of VMs 116 having container daemons 124 installed therein. Virtualization management module 130 is configured to interact with container daemons 124 installed on each of the VMs to deploy, update, or remove instances of containers on each of the VMs. Virtualization management module 130 is configured to maintain a registry 134 that tracks location, status, and other metadata of each virtual container instance executing in the plurality of VMs 116.

By implementing containers on virtual machines in accordance with embodiments described herein, response time may be improved as booting a container is generally faster than booting a VM. All containers in a VM run on a single OS kernel, thereby fully utilizing and sharing CPU, memory, I/O controller, and network bandwidth of the host VM. Containers also have smaller footprints than VMs, thus improving density. Storage space can also be saved, as the container uses a mounted shared file system on the host kernel, and does not create duplicate system files from the parent OS.

From an application point of view, there are more added benefits to the embodiments described herein. If an application is spread across VMs (for example, in the case of multi-tier applications), taking an application snapshot may be difficult since snapshots for all VMs have to be taken at exactly the same global time instant. In the case of containers, this problem is simplified since a snapshot is taken of the host VM itself which thereby has snapshots of all running containers.

If an application is spread as containers on a single host VM, it can be migrated to another host easily (such as with VMware vMotion). Hot remove of CPU/memory resources may also be available for containers. Additionally, if security of one container has been compromised, other containers may be unaffected.

Implementing containers on virtual machines also provides ease of upgrade. Since an entire application is hosted on host VM(s), upgrade of the application of the OS/security patch becomes easier. Only the VM has to be patched, and all containers deployed on a host can enjoy benefits of the patch upgrade since the containers share the same host kernel space. In addition, containers can be quickly created on a host VM after hotplug of vCPUs and hot add of memory.

In a virtual infrastructure hosting containers, embodiments described herein optimize hardware resources by providing a correct resource allocation to host VMs by looking at the consumption of containers. Ideal placement of host VMs in a server farm allows for better consolidation. Embodiments also maintain the ideal number and OS flavor of host VMs needed such that all container guest OSes are supported. Embodiments described herein reduce wastage of underlying physical resources in a datacenter. The optimizations described below may be performed on a regular basis, such as optimizing with a periodically run background job, or may be performed responsive to user input, for example from a system administrator.

The embodiments described below optimize hardware resources by providing a correct resource allocation to host VMs by looking at the consumption of containers. Embodiments also provide an ideal placement of host VMs in a server farm. A distributed resource scheduling algorithm on VMs ensures that there is optimal and just enough usage of computing power to run container service on demand. The algorithm takes into account VM life cycle activities (power-off, power-on, upsize, downsize, migration) directed towards making a group of volatile VMs act as an elastic (virtual) fabric for running containerized applications. Embodiments provide periodic resource defragmentation without application downtime and eager provisioning of VMs to maintain a healthy and minimal pool of elastic computing power.

Figure 2:
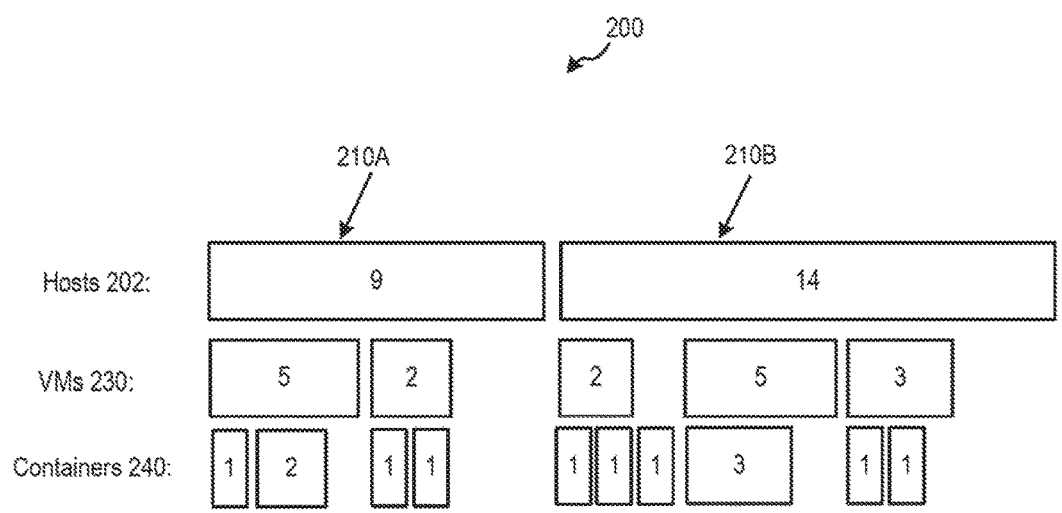
FIG. 2 illustrates an example state of a datacenter according to an embodiment.
Figure 3:
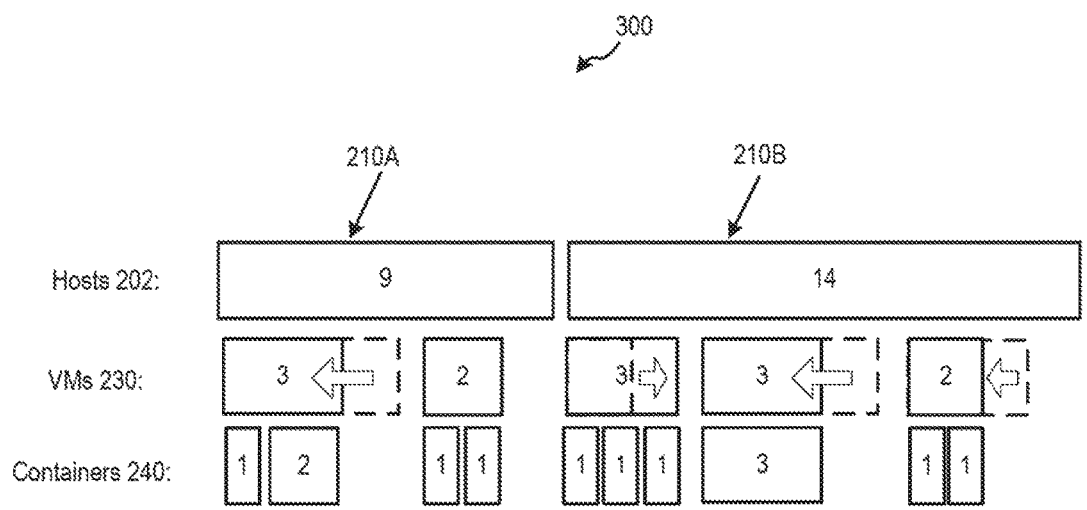
FIGS. 3-4 illustrates other example states of a datacenter according to embodiments of the present disclosure.
Figure 4:
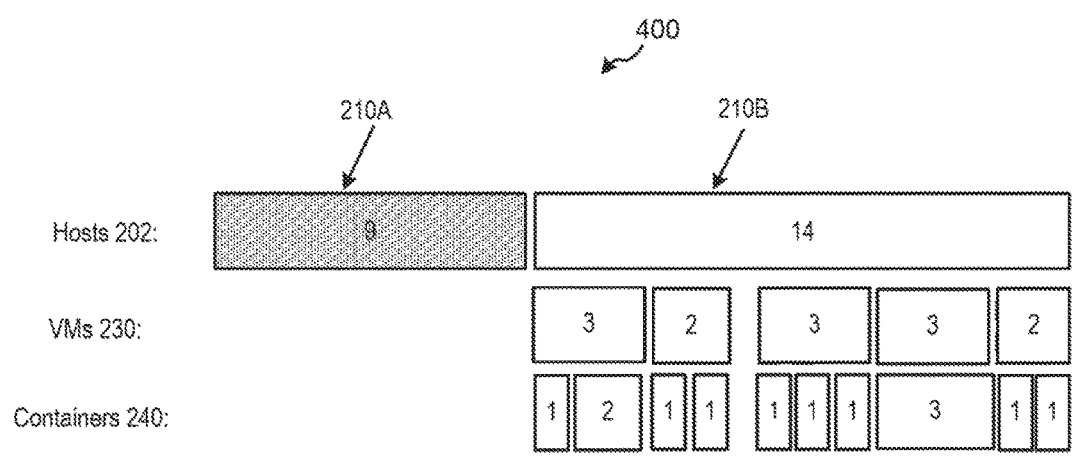

FIGS. 2-4 are block diagrams depicting states of and management operations performed on a datacenter, according to embodiments of the present disclosure. The datacenter may include a plurality of hosts 202 (similar to hosts 102) executing one or more VMs 230 (similar to VMs 116), each VM 230 configured to execute one or more containers 240 (similar to containers 126). Boxes in FIGS. 2-4 represent resources associated with the corresponding layer within the virtualized computing system. For example, each box for a host 202 represents an amount of physical computing resources (e.g., memory) available on a host 202; each box for VMs 230 represents an amount of computing resources (e.g., memory) configured for each VM 230; and each box for containers 240 represents an amount of computing resources utilized by or reserved for each container 240 (i.e., max(utilization, limit)). Other resources may be optimized instead of, or in addition to, memory. All units are in GB in FIGS. 2-4.

FIG. 2 illustrates an example initial state 200 of a datacenter. The state 200 of FIG. 2 illustrates two hosts: host 210A having 9 GB of available memory and host 210B having 14 GB of available physical memory. FIG. 2 also illustrates various VMs 230 configured for 5 GB and 2 GB of memory, respectively, on host 210A and VMs configured for 2 GB, 5 GB, and 3 GB of memory on host 210B. Containers 240 are also illustrated on the VMs and hosts with their sizes shown as well.

Gaps in the size of the VMs and the demand from containers can happen over time as containers start up and get shut down. Similarly, there may be cases of overcommit if more containers are started on a given VM and swap memory is being used. In the representations depicted in FIGS. 2-4, a VM's demand is approximated as a sum of containers' memory usage plus guest OS memory usage. The memory footprint of guest OS is generally static and is ignored here for purposes of illustration.

As seen in this state 200 of the datacenter, some VMs 230 have more resources than necessary for their containers while one VM is overcommitted. For example, a VM on host 210A having 5 GB has a 1 GB container and a 2 GB container running (i.e., 3 GB total) therein, while a VM on host 210B having 2 GB of memory has to execute three 1 GB containers in a case of overcommitment.

FIG. 3 illustrates a first step where the algorithm correctly resizes the VMs. As shown in the VMs 230 from right to left, the memory allocation for the first VM is resized from 5 to 3. The second VM remains at 2. The third VM is resized from 2 to 3. The fourth VM is resized from 5 to 3, and the last VM is resized from 3 to 2. State 300 illustrates the state of the data center after the VMs 230 have all been correctly resized.

FIG. 4 illustrates a second step where VMs 230 are migrated across hosts (in this case, from host 210A to host 210B). This step improves VM density on a few hosts while freeing up hardware resources, resulting in state 400. As a result, host 210A may be powered off, placed in a low power state, or used for other applications. In some embodiments, a VMware DRS/DPM® algorithm may be used to automatically migrate the VMs around for better consolidation, and for freeing up hosts.

Figure 5:
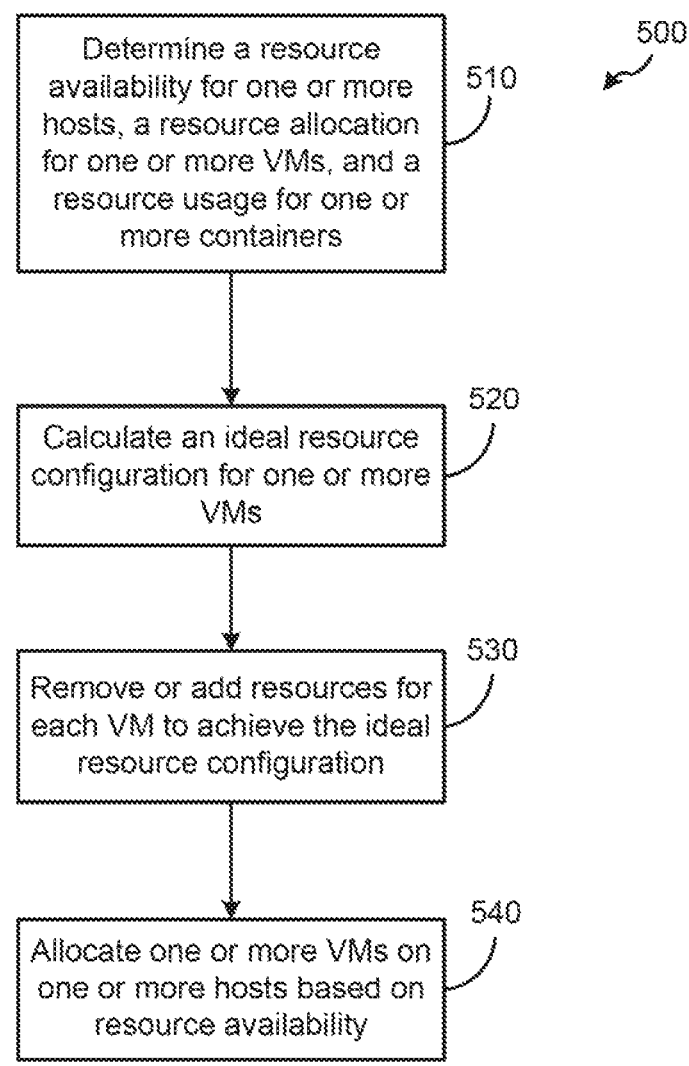
FIG. 5 is a flow diagram that illustrates a method of scheduling resources.

FIG. 5 is a flow diagram that illustrates a method 500 of scheduling resources, according to an embodiment of the present disclosure. First, at step 510, virtualization management module 130 determines resource availability for one or more hosts 102, a resource allocation for one or more VMs 116, and a resource usage for one or more containers 126. In some embodiments, virtualization management module 130 may build a tree from the relationships between hosts and VMs (i.e., "(host,VMs)") and relationships between VMs and containers (i.e., "(VM,Containers)"). In one implementation, virtualization management module 130 may query its registry 134 to retrieve relationships between hosts and VMs (e.g., via an API or command line interface). Virtualization management module 130 may further query each container daemon 124 running on each VM 116 to generate relationships between that VM 116 and containers running therein (e.g., via an API or command line interface exposed by container daemon 124.). In some embodiments, virtualization management module 130 may shut down (or otherwise suspend, kill, pause, etc.) any VMs which do not host any containers 126 based on the generated relationship information.

In some embodiments, for each entity (hosts, VMs, and containers), virtualization management module 130 fetches memory data. Memory configuration is fetched for each host, memory allocation and usage is fetched for each VM, and memory usage and limit is fetched for each container. The memory data may be retrieved using similar techniques used to retrieve relationship data, e.g., APIs and CLIs.

At step 520, virtualization management module 130 calculates an ideal resource configuration for one or more VMs, where calculating the ideal resource configuration comprises determining an upper limit of resource demand on a VM from one or more containers allocated on the VM, based at least in part on the resource usage. The ideal resource configuration calculation may also introduce a grace factor to account for inaccuracy in memory statistics.

In one or more embodiments, the ideal memory configuration may be calculated according to Equation 1:

$$VM\_ideal = \eta + (1+\delta) * \Sigma mem(Ci) \quad \text{Equation(1)}$$

where $\eta$=memory utilization by the VM's OS and container engine (generally, 1GB or so), mem(Ci)=max(memory utilization, memory limit) of the $i^{th}$ container running on this VM, and $\delta$=a small grace factor for inaccuracy in memory statistics (typically 0.1). VM_ideal is neither equal to demand nor equal to usage in any sense. Rather, this term is an upper limit of demand coming from the underlying containers.

For each VM, virtualization management module 130 compares the VM's memory allocation (mem_alloc) to the VM's corresponding "ideal" memory configuration (mem_ideal) and modifies the resource configuration based on how large a difference the allocation and configuration are. In cases where the ideal memory configuration (mem_ideal) is within a first range, for example, in the range (0, $(1-\mu_1)$ *mem_alloc), where ti is typically 0.5 or so, virtualization management module 130 dynamically removes memory from this VM to reset memory to mem_alloc. In some embodiments (for example where dynamically removal is not supported), an alert may be provided to a system administrator to power off the VM and then remove memory from the VM, and then restart containers on the VM.

In cases where the ideal memory configuration (mem_ideal) is within a second range, for example, in the range $((1-\mu_1)*mem\_alloc, (1+\mu_2)*mem\_alloc)$, where $\mu_2$ is typically 0.2, virtualization management module 130 may characterize this VM has being more or less correct in size, i.e., where mem_ideal is substantially similar to mem_alloc. In such cases, virtualization management module 130 may do nothing and skip to the next VM.

In cases where the ideal memory configuration (mem_ideal) is greater than a threshold value, for example, more than $(1+\mu_2)*mem\_alloc$, virtualization management module 130 dynamically adds memory to this VM to reset memory to mem_ideal. In embodiments where dynamically addition of memory (i.e., hot add) is not supported, virtualization management module 130 may generate an alert to a system administrator At step 530, virtualization management module 130 removes or adds resources to each of the one or more VMs for which an ideal resource configuration was calculated to achieve the ideal resource configuration for each VM. The resources can be hot added and hot removed in certain embodiments.

Finally, at step 540, the one or more VMs are allocated on the one or more hosts based on the resource availability of the one or more hosts. An algorithm may be used to migrate the VMs around for better consolidation on the hosts, and to free up hosts. The steps above can be repeated after every periodic interval (such as 24 hours, or when a threshold number of containers have been provisioned or deleted). Note that container migration from one VM to another is not utilized in the above embodiments.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. Containers implement operating system-level virtualization, wherein an abstraction layer is provided on top of the kernel of an operating system on a host computer. The abstraction layer supports multiple containers each including an application and its dependencies. Containers may run as isolated processes in user space on the host operating system and share the kernel with other containers. While multiple containers can share the kernel, each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

The invention claimed is:

1. A method for scheduling computing resources, comprising:
   determining a resource availability for one or more physical hosts configured to execute one or more virtual machines (VMs), a resource allocation for the one or more VMs, and a resource usage for one or more containers;
   calculating a target resource configuration for a VM, wherein calculating a target resource configuration comprises calculating an ideal memory configuration of the VM by summing together a memory utilization of an operating system of the VM and a container engine for deployment of the one or more containers with a summation of a maximum memory utilization of the one or more containers executed by the VM, wherein the summation of the maximum memory utilization is multiplied by a grace factor amount;
   removing or adding resources to the VM for which a target resource configuration was calculated to achieve the target resource configuration for the VM; and
   allocating the VM on the one or more physical hosts based on the resource availability of the one or more physical hosts.

2. The method of claim 1, wherein the resource removed or added is memory.

3. The method of claim 1, further comprising:
   calculating an ideal resource configuration by adding a memory utilization by the VM's guest operating system.

4. The method of claim 1, wherein identifying the one or more physical hosts on which VMs and containers can be allocated based on the resource availability further comprises identifying physical hosts with enough resources to host the VM.

5. The method of claim 1, wherein adding resources to the VM further comprises a hot add of resources to the VM.

6. The method of claim 1, wherein adding resources to the VM further comprises powering off the VM, adding resources to the VM, and restarting one or more containers allocated on the VM.

7. A non-transitory computer-readable storage medium containing a program which, when executed by one or more processors, performs operations for scheduling computing resources, the operations comprising:

determining a resource availability for one or more physical hosts configured to execute one or more virtual machines (VMs), a resource allocation for the one or more VMs, and a resource usage for one or more containers;

calculating a target resource configuration for a VM, wherein calculating a target resource configuration comprises calculating an ideal memory configuration of the VM by summing together a memory utilization of an operating system of the VM and a container engine for deployment of the one or more containers with a summation of a maximum memory utilization of the one or more containers executed by the VM, wherein the summation of the maximum memory utilization is multiplied by a grace factor amount;

removing or adding resources to the VM for which a target resource configuration was calculated to achieve the target resource configuration for the VM; and allocating the VM on the one or more physical hosts based on the resource availability of the one or more physical hosts.

8. The non-transitory computer-readable storage medium of claim 7, wherein the resource removed or added is memory.

9. The non-transitory computer-readable storage medium of claim 7, further comprising:

calculating an ideal resource configuration by adding a memory utilization by the VM's guest operating system.

10. The non-transitory computer-readable storage medium of claim 7, wherein identifying the one or more physical hosts on which VMs and containers can be allocated based on the resource availability further comprises identifying hosts with enough resources to host the VM.

11. The non-transitory computer-readable storage medium of claim 7, wherein adding resources to the VM further comprises a hot add of resources to the VM.

12. The non-transitory computer-readable storage medium of claim 7, wherein adding resources to the VM further comprises powering off the VM, adding resources to the VM, and restarting one or more containers allocated on the VM.

13. A system, comprising:

a processor; and a memory, wherein the memory includes a program executable in the processor to perform operations for scheduling computing resources, the operations comprising:

determining a resource availability for one or more physical hosts configured to execute one or more virtual machines (VMs), a resource allocation for one or more VMs and a resource usage for one or more containers;

calculating a target resource configuration for a VM, wherein calculating a target resource configuration comprises calculating an ideal memory configuration of the VM by summing together a memory utilization of an operating system of the VM and a container engine for deployment of the one or more containers with a summation of a maximum memory utilization of the one or more containers executed by the VM, wherein the summation of the maximum memory utilization is multiplied by a grace factor amount;

removing or adding resources to the VM for which a target resource configuration was calculated to achieve the target resource configuration for the VM; and allocating the VM on the one or more physical hosts based on the resource availability of the one or more physical hosts.

14. The system of claim 13, wherein the resource removed or added is memory.

15. The system of claim 13, wherein identifying the one or more physical hosts on which VMs and containers can be allocated based on the resource availability further comprises identifying physical hosts with enough resources to host the VM.

16. The system of claim 13, wherein adding resources to the VM further comprises a hot add of resources to the VM.

17. The system of claim 13, wherein adding resources to the VM further comprises powering off the VM, adding resources to the VM, and restarting one or more containers allocated on the VM.

* * * * *